INVENTOR.
JAMES D. O'BRIEN
BY
Clark & Ott
ATTORNEYS

Patented Aug. 22, 1944

2,356,607

UNITED STATES PATENT OFFICE 2,356,607

TEMPERATURE MEASURING DEVICE

James D. O'Brien, Brooklyn, N. Y.

Application April 7, 1942, Serial No. 437,983

5 Claims. (Cl. 73—349)

This invention relates to devices for measuring temperature and refers more particularly to an improved device for indicating the temperature of a gas, liquid or other fluid flowing through a duct.

The invention broadly comprehends a device of the character set forth which includes a temperature measuring instrument, such as a thermometer or its equivalent, located exteriorly of a duct through which the gas, liquid or other fluid is flowing and which device also includes means for subjecting the temperature measuring instrument to the heat or pressure of a fluid medium circulating through the duct and acted upon by the fluid flowing therethrough.

The invention further resides in a temperature indicator of the character set forth in which a temperature measuring instrument located exterior of the duct is actuated by a fluid heat conducting medium circulated in an endless conduit which is disposed partially within the duct for the purpose of continuously subjecting the instrument to a temperature coinciding with the temperature of the fluid flowing through the duct to thereby render the indicator sensitive and responsive to variations in the temperature of the fluid in the duct.

More particularly the invention is directed to a temperature indicator in which the circulation of a fluid heat conducting medium for actuating the temperature measuring device is accomplished by effecting a density differential in said heat conducting medium.

With the above recited and other objects in view, the invention is set forth in greater detail in the following specification and illustrated in the accompanying drawing in which.

Figure 1:
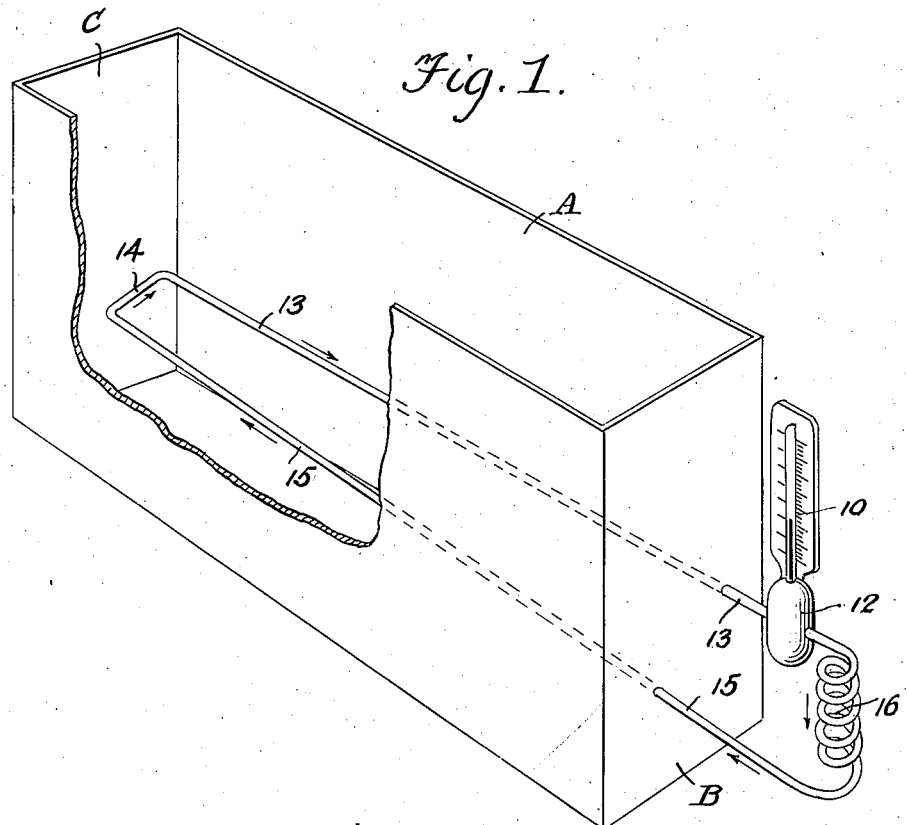
Fig. 1 is a fragmentary perspective view of a fluid duct equipped with a temperature indicator constructed in accordance with the invention.
Figure 2:
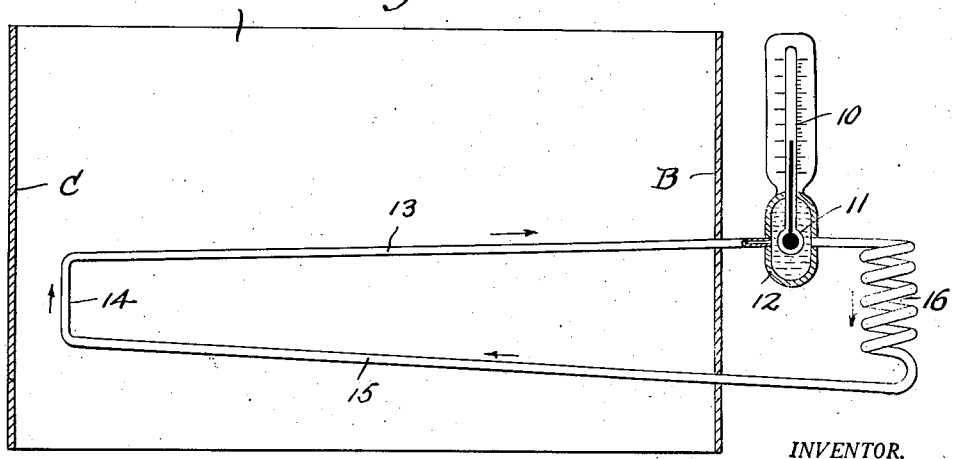
Fig. 2 is a vertical sectional view therethrough.

Referring to the drawing by characters of reference, A designates a tubular duct through which flows a heated liquid, gas or other fluid. In order to determine the temperature of the fluid passing through the duct, the present invention comprehends a temperature indicator which embodies a temperature measuring instrument such as a thermometer 10, or its equivalent, the bulb 11 of which is arranged in a closed chamber 12 which forms a part of a circulatory system for a fluid heat conducting medium such as a liquid or gas, a part of which system is disposed within the duct A and the other part of which, including the chamber 12, is disposed exterior of the duct.

In the form of the invention illustrated, the circulatory system is composed of a tubing having an upper lead 13 communicating with the chamber 12 and extending therefrom through one wall B of the duct A and interiorly of and across the duct and spaced from the opposite wall C thereof. The tubing includes a downwardly extending bight portion 14 and a lower lead 15 which extends across the duct A in a direction opposite to the upper lead. The lower lead extends through the wall B of the duct at a point below that through which the upper lead extends. The exterior portion of the lower lead 15 extends upwardly and is formed into a heat dissipating coil 16 with the upper terminal of the coil connected with and communicating with the chamber 12. Preferably, the lower lead 15 from its point of entry within the duct inclines or extends upwardly at an angle to its juncture with the bight portion 14, while the upper lead 13 extends upwardly or inclines from its juncture with the bight portion 14 to its point of emergence from the duct A.

By virtue of this construction and arrangement, circulation of the fluid heat conducting medium is effected by the density differential caused by the heating of said medium in the portion of the tubing disposed within the duct A and the cooling of the medium in the portion of the tubing disposed exteriorly of the duct particularly at the coil 16 where the dissipation of the heat is accelerated causing the cooled and denser medium to descend through the coil to the lower portion of the lead 15. At the point of entry of the lower lead 15 into the duct A the heat conducting medium is progressively heated and the inclination of the lower lead 15 induces the flow of said medium towards the bight portion 14, thence upwardly therethrough and the flow of the same through the inclined upper lead 13 to the chamber 12 so that the bulb 11 of the thermometer is subjected to the temperature of the heat conducting medium immediately as it leaves the duct and when the medium is substantially at the same temperature as the temperature of the fluid flowing through the duct A.

Within the scope of the invention it is to be understood that the fluid heat conducting medium may be in the form of a liquid such as an oil, a gas or any other suitable fluid. If desired, water may be used in a predetermined quantity to partially fill the tubing so that a part thereof is converted into steam at the temperature or pressure corresponding to the temperature of the fluid flowing through the duct for measurement by the thermometer or, if desired, by any suitable type of steam gage actuated by the steam or vapor pressure, which gage could be calibrated so as to provide temperature readings.

By use of a temperature indicator of the character set forth having the circulating fluid heat conducting medium, a more sensitive and rapid response to the changes in temperature of the fluid flowing through the duct may be indicated and fluctuations or variations in the temperature of the fluid observed and noted.

What is claimed is:

1. In a device for indicating the temperature of a fluid flowing through a duct, an endless circulatory conduit for a fluid heat conducting medium having portions thereof located respectively within the duct and exteriorly thereof, and said conduit including vertically spaced leads communicating with each other at the opposite ends thereof and adapted to effect gravitational circulation of the heat conducting medium due to the temperature and density differential thereof in the internal and external portions of the same, and a temperature measuring instrument extending into the upper lead of the exteriorly disposed portion of the conduit adjacent its emergence from the duct.

2. In a device for indicating the temperature of a heated fluid flowing through a duct, an endless circulatory conduit for fluid heat conducting medium including vertically spaced substantially horizontal leads and substantially vertical leads respectively communicating with the opposite ends of the vertically spaced leads with a portion of said conduit disposed within the duct for heating said medium, and a portion of the same disposed exterior of said duct for cooling said heat conducting medium, the said portion of said conduit disposed within the duct being adapted to heat said medium therein to a greater degree than the medium in the external portion of the conduit so as to provide in the heat conducting medium a density differential which effects gravitational circulation of said medium, and a temperature measuring instrument extending into the conduit adjacent its emergence from the duct for indicating the temperature of the fluid flowing through the duct.

3. A device for indicating the temperature of a fluid flowing through a duct, including a temperature measuring instrument located exteriorly of the duct, a continuous conduit containing fluid heat conducting medium having an upper lead within the duct extending to and inclining towards the temperature measuring instrument and a return lead extending downwardly from the instrument and into the duct and having a portion disposed at an opposite inclination to the upper lead and connected and communicating therewith to provide a circulatory passageway through which the heat medium is circulated by the density differential of said medium.

4. In a device for indicating the temperature of a heated fluid flowing through a duct, an endless circulatory conduit arranged in an upstanding plane and located partially within the duct and partially exterior thereof, a fluid heat conducting medium contained within said conduit and adapted to be heated therein by the heat of the fluid flowing through the duct and to be cooled by contact of the atmosphere with the portion of the conduit disposed exteriorly of said duct, the arrangement of said conduit functioning to produce a heat differential in the portions of the medium respectively located in the regions of the conduit disposed within the duct and exterior thereof so as to effect gravitational circulation of said medium, and a temperature measuring instrument extending into the conduit adjacent its emergence from the duct for indicating the temperature of the fluid flowing through the duct.

5. In a device for indicating the temperature of a heated fluid flowing through a duct, an endless circulatory conduit having a portion thereof disposed within the duct in the path of the heated fluid flowing therethrough and having a portion thereof disposed exterior of said duct and extending in a tortuous arrangement surrounded by the normally cooler atmosphere outside the duct, a fluid heat conducting medium contained within said conduit and adapted to be heated therein by the heat of the fluid flowing through the duct and adapted to be cooled by flowing through the portion of the conduit disposed exterior of said duct, the portion of said conduit within the duct being arranged at an inclination between the points of entrance and emergence therefrom to provide a density differential in the heat conducting medium when the same is heated by the fluid flowing through the duct so as to effect gravitational circulation of said medium, and a measuring instrument extending into the conduit adjacent its emergence from the duct to indicate the temperature of the fluid flowing from the duct.

JAMES D. O'BRIEN.